Figure 8:
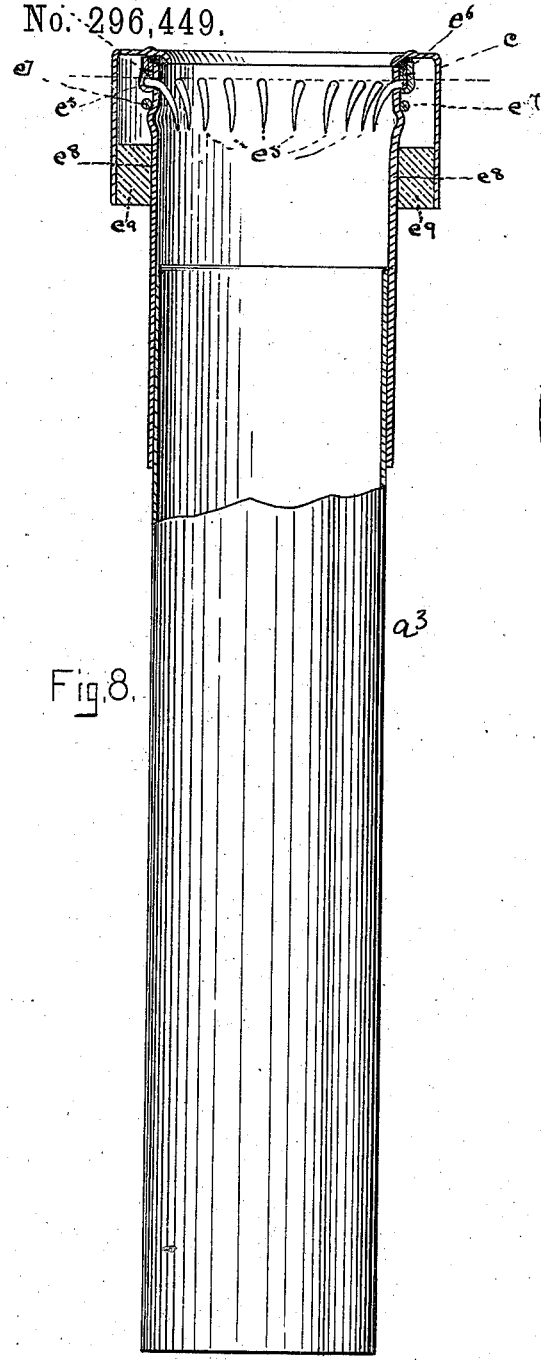

(No Model.)  3 Sheets—Sheet 1.
W. J. POWELL.
COTTON HARVESTER.
No. 296,449. Patented Apr. 8, 1884.
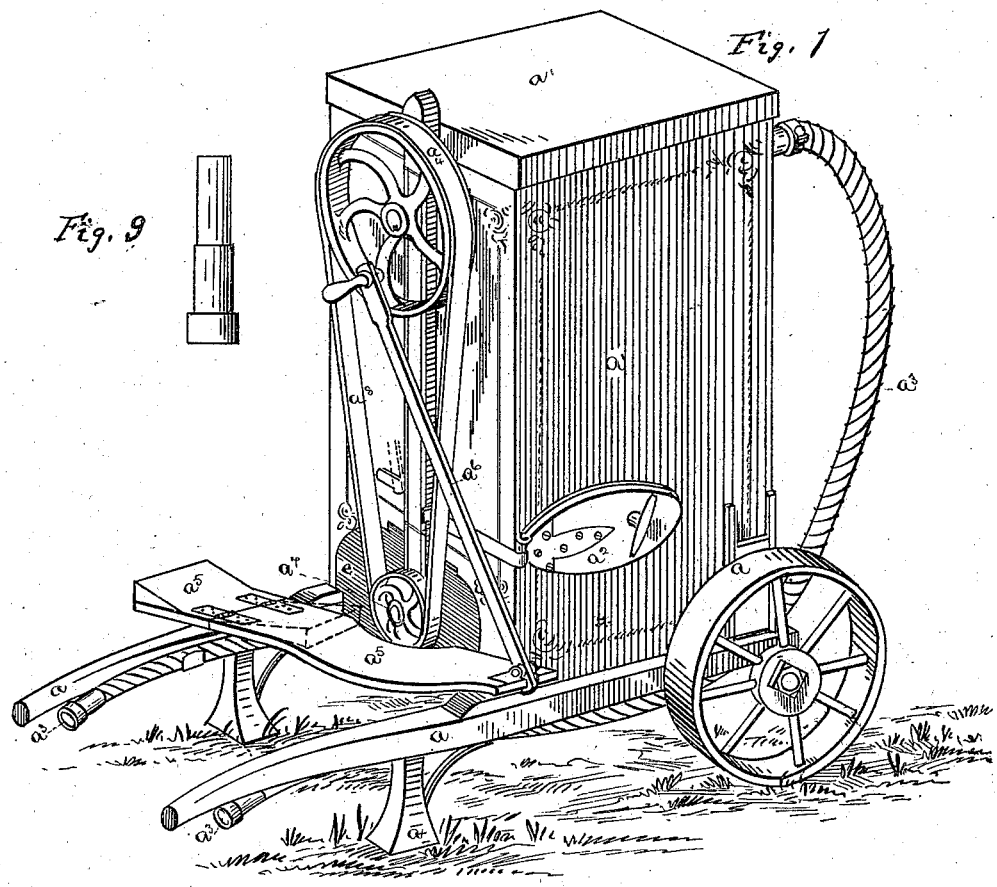
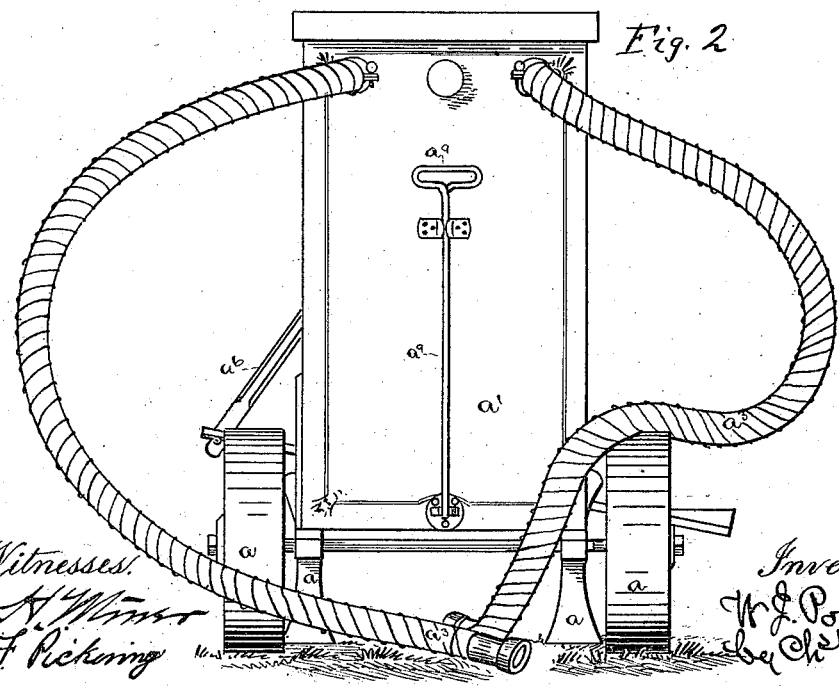
Witnesses: Inventor:

(No Model.) 3 Sheets—Sheet 2.
W. J. POWELL.
COTTON HARVESTER.
No. 296,449. Patented Apr. 8, 1884.
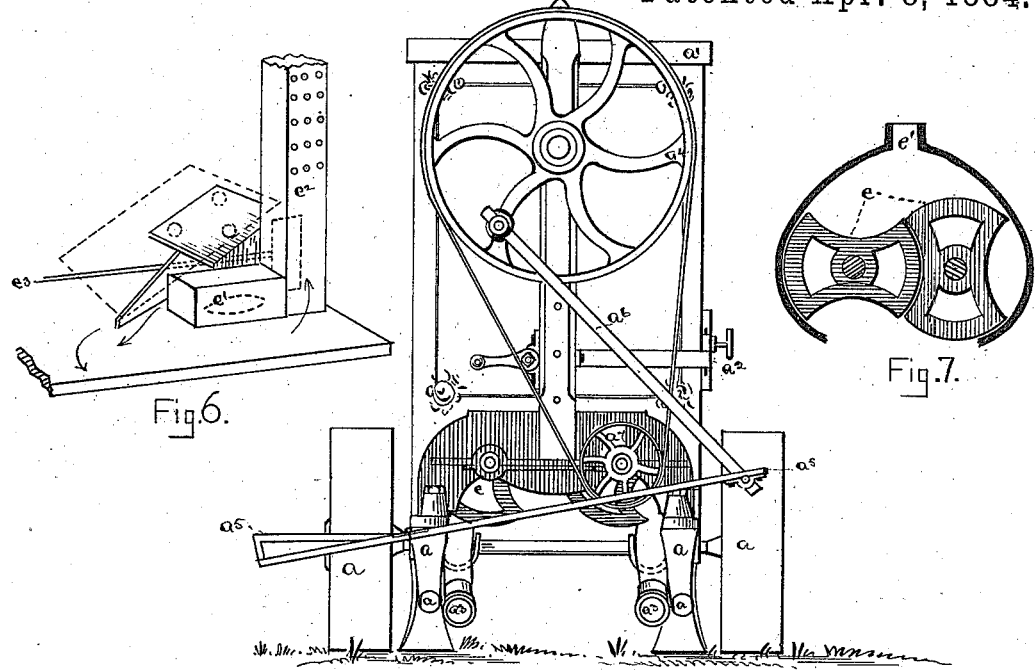
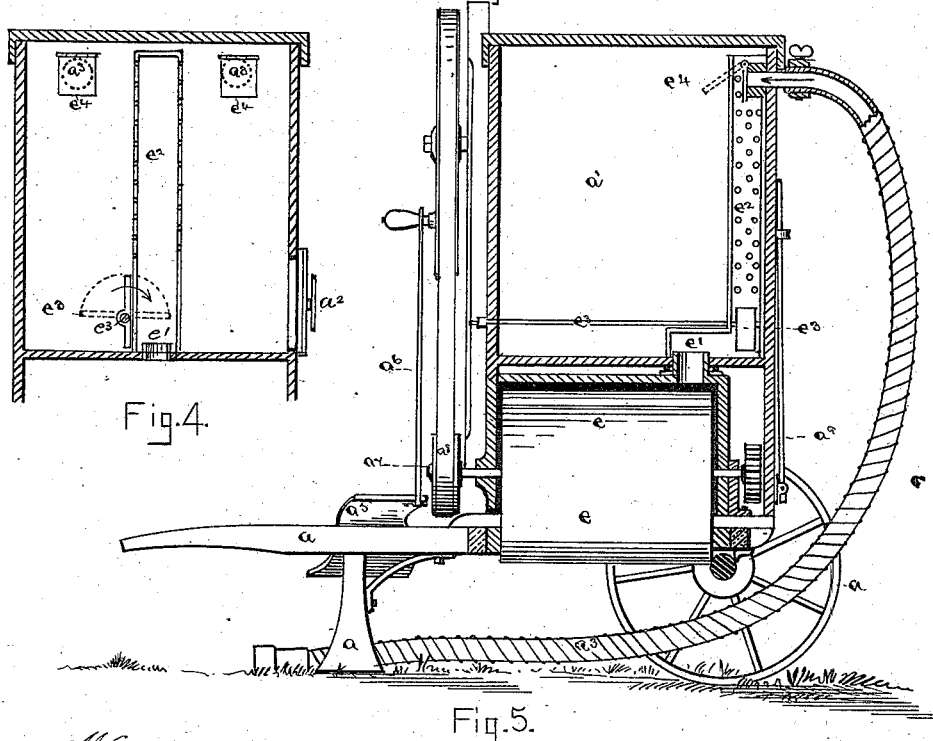
Witnesses:
Geo. H. Miner
J. F. Pickering
Inventor:
W. J. Powell
by Ch. Houghton
atty
N. PETERS, Photo-Lithographer, Washington, D. C.

(No Model.) 3 Sheets—Sheet 3.

W. J. POWELL.
COTTON HARVESTER.

No. 296,449. Patented Apr. 8, 1884.

Witnesses:
Geo. H. Winer
J. F. Pickering

Inventor:
W. J. Powell
by Ch. Houghton atty

N. PETERS, Photo-Lithographer, Washington, D. C.

UNITED STATES PATENT OFFICE.

WILLIAM J. POWELL, OF MARSHFIELD, MASSACHUSETTS, ASSIGNOR TO THE POWELL COTTON HARVESTER COMPANY, OF CONCORD, N. H.

COTTON-HARVESTER.

SPECIFICATION forming part of Letters Patent No. 296,449, dated April 8, 1884.

Application filed May 22, 1882. (No model.)

*To all whom it may concern:*

Be it known that I, WILLIAM J. POWELL, of Marshfield, in the county of Plymouth and Commonwealth of Massachusetts, have invented a new and useful Improvement in Cotton-Harvesters, of which the following is a specification.

My present invention relates to improvements upon the cotton-harvester patented to me March 22, 1881, the object being to perfect the working of the harvester made as described in that patent by adding the mechanical devices necessary to make its operation more effectual and useful; and it consists in an improvement in the device for seizing and loosening the cotton in the boll or pod.

As the harvester is to be moved between the rows of cotton-plants, I construct it on a truck or hand-barrow of sufficient strength to support it, with its load of gathered cotton, and an attendant, who propels the air-forcing apparatus, the truck being of a width to pass between the rows without injury to the plants, and having broad-faced wheels and feet to prevent sinking in soft ground.

In the drawings annexed (three sheets) I have shown the entire harvester and all its parts as I now construct it, and will describe the whole.

Figure 10:
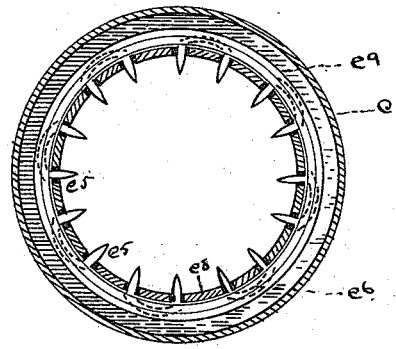
Figures 11, 12:
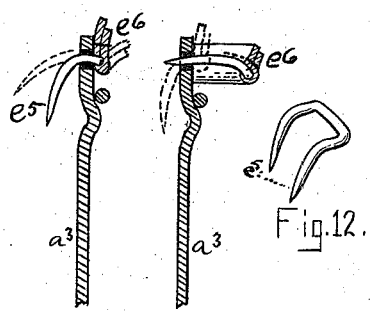

Figure 1 is a perspective of the harvester complete. Fig. 2 is a front view of it. Fig. 3 is a rear end elevation. Fig. 4 is a transverse section. Fig. 5 is a side sectional elevation. Fig. 6 shows devices for reversing the action of the air in the harvester. Fig. 7 shows a transverse section of the air-forcing device or blower. Fig. 8 shows a longitudinal section of the nozzle; Fig. 9, nozzle detached. Fig. 10 shows the end of the nozzle with the cap off; Fig. 11, sections of the end of the nozzle with the claw. Fig. 12 shows a claw detached.

The letters used below indicate the same parts in the different figures.

$a$ is the truck or barrow upon which the harvester is mounted, consisting of a frame, wheels, and handles for moving it about.

$a'$ is a chamber or receptacle, into which the cotton is gathered, and may be of any convenient form. It is made substantially air-tight, except the openings through which the cotton enters it, and the openings through which the air is withdrawn from it or forced into it, as occasion may require. It is made of wood and lined with tin.

$a^2$ is a door in $a'$, through which the cotton gathered is forced out by a current of air, or withdrawn by hand. This door is packed, so that when closed it is practically air-tight.

$a^3 a^3$ are flexible tubes of about one and one-half inch inside diameter, affixed to openings in the chamber $a'$, and of a convenient length to handle and reach the cotton-plants one or two rows away. These tubes are made of india-rubber or other suitable flexible material, and re-enforced, to prevent collapsing, with wire wound spirally about them. They are provided with nozzles having a circle of claws around the inner diameter, to catch into and detach the cotton and seed from the husk. On the inner end of these tubes, inside the chamber $a'$, there are flap-valves, described below.

$a^4$ is the crank-pulley, by which the air-forcing device or blower is moved.

$a^5$ is a treadle device, upon which an attendant standing can aid, by the weight of his body shifted alternately from one foot to the other, the turning of the crank-pulley $a^4$. This treadle is balanced over one side of the frame of the truck, and is also in two parts hinged together on the upper side over the side frame, so that that part of the treadle outside of the frame, when it is in use, can be folded over on the part inside the frame when the harvester is to be moved, and thus prevent injury to the cotton-plants, which would otherwise ensue when the harvester is moved forward between the rows.

$a^6$ is a pitman connecting the treadle $a^5$ with the crank-pulley $a^4$.

$a^7$ is a pulley on the shaft of the air-forcing device or blower, which takes motion from the crank-pulley $a^4$ by a belt running over and around both. The member of the blower on this shaft is moved directly by it, and the opposite member is turned by gears from it.

$a^8$ is a belt around the pulleys $a^4$ and $a^7$.

$a^9$ is a tongue or shaft on the front part of the harvester, by which one attendant can aid another working at the handles of the truck in moving it forward.

$e$ is the air-forcing device or blower, which consists of a metallic shell of suitable form and dimension, containing two members of irregular form, which revolve together in such manner as at all times will make them together form a practically air-tight partition across the inner diameter of the shell of the blower in a horizontal line. These two members revolving in opposite directions will carry to or from the chamber $a'$, according to the direction in which they are made to move, a steady flow of air. Thus by turning the crank-pulley $a^4$ in one direction the air is exhausted from the chamber $a'$ and a partial vacuum created in it; and by turning in the opposite direction air is forced into the chamber. This blower is located in a chamber under the chamber $a'$, and $e'$ is a passage for air from the blower into or from the chamber $a'$.

$e^2$ is a perforated tube or box, made of any suitable material, preferably sheet metal, standing perpendicularly on one side of the chamber $a'$ and within it, through which and its perforations air from the chamber $a'$ to the blower or from the blower to the chamber passes, the purpose of it being to prevent the cotton from being drawn into the blower when it is drawing air from the chamber $a'$.

$e^3$ is a valve, to be opened and closed at will by an attendant. When the harvester is in use picking cotton, this valve is turned to close an aperture at the bottom of and in the side of the tube $e^2$, and when it is necessary to discharge the cotton gathered from the chamber $a'$, the valve is turned to close the passage through the tube $e^2$ just below the perforations in it, and the air passes into the chamber $a'$ through the aperture in the side of the tube $e^2$.

$e^4 e^4$ are flap-valves over the ends of the flexible tubes $a^3$ inside the chamber $a'$, which open when air is exhausted from the chamber and close when air is forced into it.

$e^5 e^5$ are the claws on the inner periphery of the nozzle. They consist of wire staples bent in the form shown in Fig. 12, and pointed at the two ends, the points inward and downward in the nozzle through the holes made for them in the metallic inner tube of the nozzle. These staples are seated in a twisted band of rubber around the outside of the end of the inner metallic tube, which yields when the points engage the boll of cotton, and allows the claws to slide backward through the holes in the metallic tube of the nozzle, so that they may be easily disengaged from the cotton-boll.

$e^6$ is the twisted rubber band.

$e^7$ is a wire around the outside of the inner metallic tube of the nozzle a little back of the twisted rubber band $e^6$, which acts as a stop against which the rubber band and the bar of the staples forming the claws will bring up and prevent the claw's points from being drawn out of the holes in the tube.

$e^8$ is the metallic tube of the nozzle.

$e^9$ is a ring of wood slipped onto the outside of the tube of the nozzle, upon which the cap or outer shell of the nozzle engages and holds.

$c$ is the outer shell or cap of the nozzle, to inclose and protect the twisted rubber band, the claws, and wire above described. It is made of dimensions to correspond with the tube of the nozzle and the wooden ring $e^9$, onto which it goes, and fits tight enough to keep it in place.

A practical use or trial of the cotton-harvester patented to me March 22, 1881, demonstrated that a fan-blower would not force air so as to make the working of the harvester satisfactory, and the necessity of using a device for that purpose which would be positive in its action and allow no escape of air, as in the attempted use of a fan, if the current of air met with resistance, it would be forced out at the center of the fan.

To use the cotton-harvester in the field in gathering cotton, two or more attendants are required—one to turn the crank-pulley $a^4$ and aid himself by the use of the treadle device, and one or more to handle and direct the gathering-tubes $a^3$. One attendant may take a gathering-tube in each hand; or there may be one attendant to handle each tube. The attendant on the harvester, by actuating the air-forcing device or blower by means of the crank-pulley and treadle, creates a partial vacuum in the chamber $a'$ and a strong rush of air inward through the tubes $a^3$, so that when the nozzle of the tube is held near a ripe boll of cotton it is instantly carried into the chamber $a'$. If the cotton adheres from any cause to the husk, the nozzle is placed over it, and the claws in the nozzle catch hold and detach it from the husk, when it is instantly carried to the chamber. Thus two attendants with the harvester will gather as much cotton as ten persons could without it in the ordinary way, and cotton gathered by the harvester is much cleaner and more desirable than that picked by hand. The cotton is discharged from the chamber $a'$ by opening the door $a^2$ and turning the blower backward and forcing air into the chamber $a'$.

I have described and shown the combination of the air-forcing apparatus and the other devices to constitute a cotton-harvester, but do not herein claim such combination, reserving it for the subject of another application.

I claim—

In a cotton-harvester, in combination with the flexible tubes $a^3$, the claws $e^5$ in the nozzle, supported by the yielding elastic band $e^6$, substantially as described.

WILLIAM J. POWELL.

Witnesses:
  CHS. HOUGHTON,
  J. F. PICKERING.